(12) United States Patent
Weindorf

(10) Patent No.: US 7,262,752 B2
(45) Date of Patent: Aug. 28, 2007

(54) SERIES LED BACKLIGHT CONTROL CIRCUIT

(75) Inventor: Paul F. L. Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 441 days.

(21) Appl. No.: 09/939,267

(22) Filed: Aug. 23, 2001

(65) Prior Publication Data
US 2002/0130786 A1   Sep. 19, 2002

Related U.S. Application Data

(60) Provisional application No. 60/261,760, filed on Jan. 16, 2001.

(51) Int. Cl.
*G09G 3/32* (2006.01)
(52) U.S. Cl. .......................... 345/82; 345/88; 345/102; 315/307; 315/291
(58) Field of Classification Search .................. 345/82, 345/88, 102; 315/307, 291, 149, 157–158
See application file for complete search history.

(56) References Cited

U.S. PATENT DOCUMENTS

| | | | |
|---|---|---|---|
| 3,925,690 A | | 12/1975 | Spence |
| 4,090,189 A | | 5/1978 | Fisler |
| 4,160,934 A | | 7/1979 | Kirsch |
| 4,959,642 A | | 9/1990 | Sharples |
| 5,105,179 A | * | 4/1992 | Smith .......................... 340/468 |
| 5,359,691 A | | 10/1994 | Tai et al. |
| 5,390,276 A | | 2/1995 | Tai et al. |
| 5,422,756 A | | 6/1995 | Weber |
| 5,528,720 A | | 6/1996 | Winston et al. |
| 5,555,583 A | * | 9/1996 | Berkcan ........................ 8/158 |
| 5,598,068 A | * | 1/1997 | Shirai ...................... 315/185 R |
| 5,712,922 A | * | 1/1998 | Loewenthal et al. ........ 382/155 |
| 5,783,909 A | | 7/1998 | Hochstein |

(Continued)

FOREIGN PATENT DOCUMENTS

DE   196 02 891 A1   8/1997

(Continued)

OTHER PUBLICATIONS

Osram Opto Semiconductors brochure entitled "High Brightness—High Temperature Power Topled®", printed by Infineon Technologies, undated, 4 pages.

(Continued)

*Primary Examiner*—Richard Hjerpe
*Assistant Examiner*—Leonid Shapiro
(74) *Attorney, Agent, or Firm*—Brinks Hofer Gilson & Lione

(57) ABSTRACT

A light emitting diode control circuit provides a plurality of series light emitting diodes (LEDs) that are fault tolerant, temperature compensated, and temperature derated. The series LEDs may be used to backlight an LCD in such applications as laptop computers, personal digital assistants, cellular telephones and automotive applications. An optional luminance compensation circuit adjusts the current through the LEDs as a function of an LED temperature to maintain a substantially consistent LED intensity. An optional temperature derating circuit reduces the current through the LEDs when the temperature reaches a threshold. The LED temperature may also be provided externally via a temperature output signal.

16 Claims, 4 Drawing Sheets

U.S. PATENT DOCUMENTS

| | | | |
|---|---|---|---|
| 5,828,488 A | | 10/1998 | Ouderkirk et al. |
| 5,924,784 A | * | 7/1999 | Chliwnyj et al. ............ 362/234 |
| 5,978,468 A | * | 11/1999 | Boakes ....................... 379/354 |
| 6,069,448 A | | 5/2000 | Yeh |
| 6,069,449 A | | 5/2000 | Murakami |
| 6,075,595 A | * | 6/2000 | Malinen ...................... 356/328 |
| 6,084,519 A | * | 7/2000 | Coulling et al. ............ 340/602 |
| 6,107,985 A | | 8/2000 | Walukas et al. |
| 6,124,971 A | | 9/2000 | Ouderkirk et al. |
| 6,130,700 A | * | 10/2000 | Murayama et al. ......... 347/240 |
| 6,147,723 A | | 11/2000 | Mochizuki |
| 6,150,771 A | * | 11/2000 | Perry .......................... 315/291 |
| 6,161,910 A | | 12/2000 | Reisenauer et al. |
| 6,323,598 B1 | * | 11/2001 | Guthrie et al. .......... 315/200 A |
| 6,351,079 B1 | * | 2/2002 | Willis ...................... 315/200 A |
| 6,362,578 B1 | * | 3/2002 | Swanson et al. ............ 315/307 |
| 6,411,046 B1 | * | 6/2002 | Muthu ........................ 315/309 |
| 6,448,951 B1 | * | 9/2002 | Sakaguchi et al. ............. 345/88 |
| 6,473,469 B1 | * | 10/2002 | Leitch ........................ 375/308 |
| 6,724,156 B2 | * | 4/2004 | Fregoso ...................... 315/291 |

FOREIGN PATENT DOCUMENTS

| | | |
|---|---|---|
| DE | 198 41 490 A1 | 3/2000 |
| DE | 198 43 330 A1 | 3/2000 |
| DE | 199 30 174 A1 | 1/2001 |
| EP | 1 079 667 A2 | 2/2001 |
| WO | WO99/39319 | 8/1999 |
| WO | WO 02/33799 A1 | 4/2002 |

OTHER PUBLICATIONS

Osram Opto Seminconductors Innovative Technology Sets New Standards brochure entitled "LED in General Lighting," printed by Osram Sylvania, Inc., undated, 16 pages.

Osram Opto Semiconductors brochure entitled "LED for Traffic Applications", printed by Infineon Technologies, undated, 9 pages.

Bond Ply™ 100 brochure entitled Thermally Conductive, Pressure Sensitive Adhesive Tape, printed by The Berquist Company, dated Jan. 25, 2001.

Sheldahl product bulletin for Standard Flex, Single Layer Flexible Circuit Interconnect, printed by Sheldahl, undated, 2 pages.

Sheldahl product bulletin for Standard Flex, Double Layer Flexible Circuit Interconnect, printed by Sheldahl, undated, 2 pages.

Sheldahl product bulletin for *Novaflex®* HD, High Density Flexible Circuit Interconnect, printed by Sheldahl, undated, 2 pages.

Sheldahl product bulletin for *Novaflex®* VHD, Very High Density Flexible Circuit Interconnect, printed by Sheldahl, undated, 2 pages.

Sheldahl product listing for Flexible Interconnect Products, from <http://www.shedahl.com/Product/FlexInter.htm>, printed from the Internet on Sep. 13, 2001, 2 pages.

* cited by examiner

SERIES LED BACKLIGHT CONTROL CIRCUIT

REFERENCE TO RELATED APPLICATION

This application claims the benefit of U.S. Provisional Application No. 60/261,760, filed Jan. 16, 2001, titled "AMLCD LED Backlighting Navigation Radio Display" which is incorporated herein by reference.

BACKGROUND

This invention relates generally to the field of light emitting diode ("LED") circuits, and more specifically to the fields of control circuits for backlighting of LCDs and other devices, where the LED circuit is fault tolerant.

Backlighting for active matrix liquid crystal displays ("AMLCD") typically uses a cold cathode fluorescent lamp ("CCFL") device. CCFL devices tend to have high back lighting efficacies. CCFL devices have numerous drawbacks. For example, CCFL devices may contain Mercury, a highly dangerous substance that has been banned from many AMLCD applications. CCFL devices may have poor efficacy at lower temperatures, which requires additional circuitry such as a heater element or a boost current circuit. CCFL devices may have a non-linear efficacy curve with respect to temperature. CCFL devices may require an inverter to drive the CCFL device. CCFL devices may require complex control schemes, including light sensors and temperature sensors to provide adequate dimming ratios for night time operations. CCFL devices may have a short life expectancy, especially at lower operating temperatures, and may require additional electromagnetic interference ("EMI") shielding and electric filtering.

Alternatives to CCFL devices for back lighting an AMLCD include Xenon-based devices. Xenon-based backlighting circuits do not contain Mercury, have superior low temperature life expectancy and low temperature operational characteristics, and have less phosphor degradation than CCFL devices. However, Xenon lamps tend to be relatively expensive and require complex control circuitry. Xenon lamps have low efficacy. For example, a Xenon lamp with twice the diameter may provide only half the brightness of a mercury-based CCFL lamp. Because the efficacy of the Xenon lamp may be less than half of a CCFL lamp, the additional power needed to power a Xenon based circuit creates a problem of power consumption. While Xenon lamps correct many of the problems of the CCFL lamp technology, the Xenon lamp technology creates many new problems. Thus, there is a need in the LCD field to create a new and useful back light device and drive circuit.

SUMMARY

A light emitting diode control circuit provides a plurality of series light emitting diodes (LEDs) that are fault tolerant, temperature compensated, and temperature derated. The series LEDs may be used to backlight an LCD in such applications as laptop computers, personal digital assistants, cellular telephones and automotive applications. An optional luminance compensation circuit adjusts the current through the LEDs as a function of an LED temperature to maintain a substantially consistent LED intensity. An optional temperature derating circuit reduces the current through the LEDs when the temperature reaches a threshold. The LED temperature may also be provided externally via a temperature output signal.

The foregoing discussion has been provided only by way of introduction. Nothing in this section should be taken as a limitation on the following claims, which define the scope of the invention.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

A. Definitions

AMLOD—Active matrix Liquid Crystal Display.

CCFL—Cold cathode fluorescent lamp.

CCFL inverter—A circuit that provides the necessary voltage and current to properly control the light output of a LCD CCFL light output.

LCD—Liquid crystal display.

Efficacy—The conversion efficiency of converting Watts into lumens (lumens/watt)

LED—Light emitting diode.

Lumen—A unit of light power useful to the human eye and defined as the spectral luminous efficacy for monochromatic light at the peak visual response wavelength of 555 nm.

NIT—A unit of luminance for light reflected, transmitted, or emitted by a diffusing surface.

PWM—Pulse width modulation.

B. Introduction

The improved LED circuit provides backlighting for AMLCDs with numerous LEDs, eliminating many of the problems associated with CCFL and Xenon systems. The improved LED circuit also provides improved LED control for other applications. The LEDs are configured in series with a diode or similar device in parallel to provide fault tolerance. A current sampling circuit detects the current flowing through the LEDs and adjusts the LED input voltage accordingly.

An optional temperature compensation circuit may be used to maintain the desired luminance of the LEDs as a function of the temperature of the LEDs. An optional temperature derating circuit may be used to reduce the LED current when the LED temperature exceeds a temperature threshold. The temperature derating circuit may increase the life expectancy of the LEDs.

Such an LED circuit may be used in systems for backlighting LCDs. Such systems may be used in automotive applications, computer applications including laptop computers, personal digital assistances, cellular telephones, and others. A backlighting system with multiple LEDs connected in a series configuration instead of in a parallel configuration has less power dissipation. Such system may have approximately 25% less power dissipation. This is especially important for battery operated devices, such as laptops PDA, cellular telephone, etc., and devices with limited heat dissipation capabilities.

The following description of the invention is not intended to limit the scope of the invention, but rather to enable any person skilled in the art to make and use the invention.

C. The Light Emitting Diode Circuit

Figure 1:
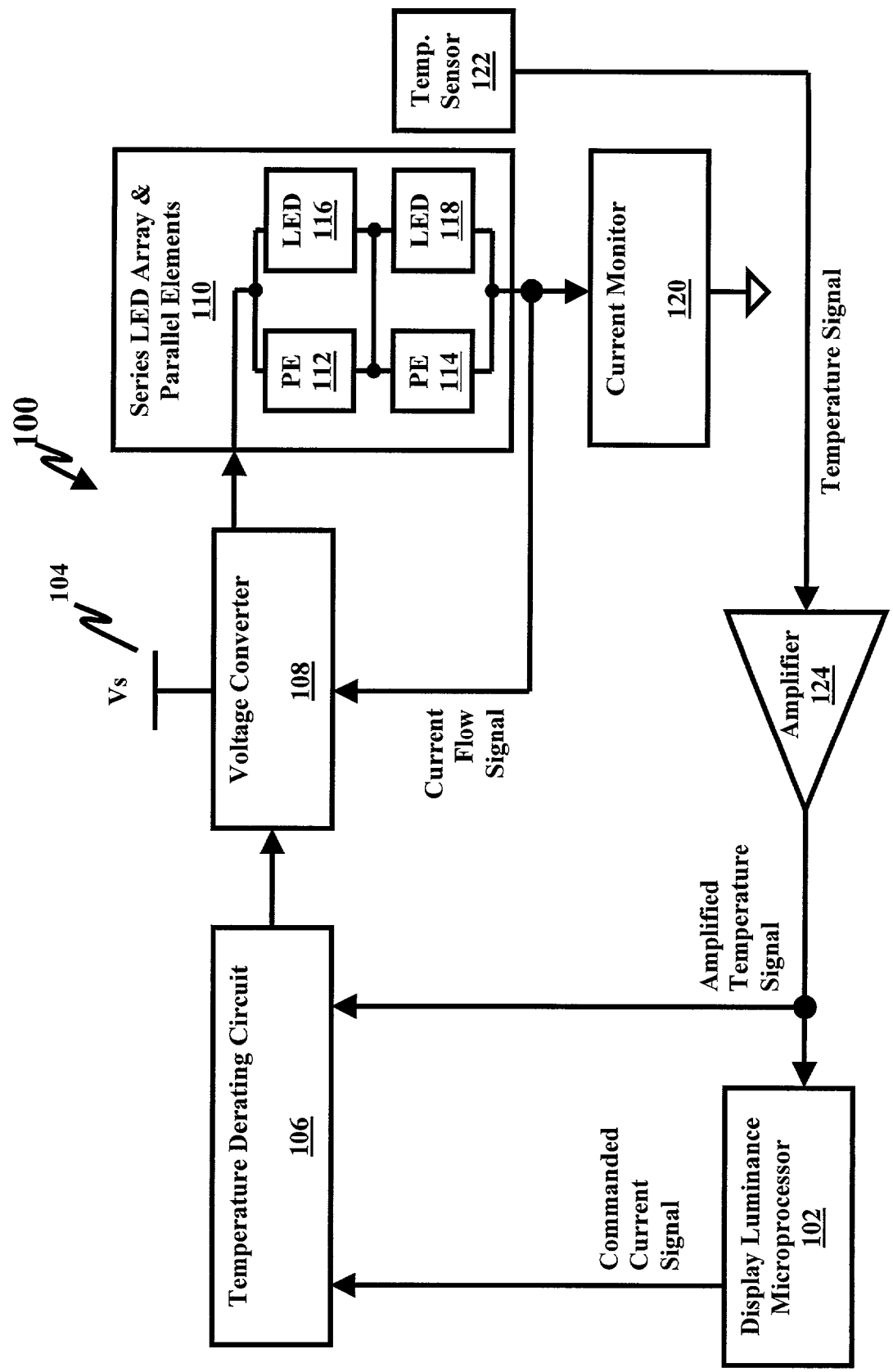
FIG. 1 illustrates a block diagram of a series LED control circuit.

FIG. 1 illustrates a fault tolerant series LED system 100. The LED system 100 may include an array of LED connected in series and parallel elements connected in parallel with the LEDs 110, a current monitor 120, a voltage converter 108, and an optional temperature derating and brightness circuits. The optional temperature derating and brightness circuits may include a temperature sensor 122, an amplifier 124, a display luminance microprocessor 102, and a temperature derating circuit 106. The LED system 100 may include only some of these components, other components, and/or equivalent components.

The LED array 110 may include a plurality of LEDs 116 and 118 connected in series. The LEDs may include white or colored LEDS, such as red, green, blue, or another colored LEDS, or a combination of different types of LEDs. While FIG. 1 illustrates only two LEDs in the LED array 110, the LED array 110 may have any number of LEDs, for example 2 to 50,000 LEDs or more. The parallel elements 112 and 114 provide fault tolerance for open circuits in the series LEDs. An open circuit may be caused by a failed LED, a failed solder connection, or other failure. The parallel elements 112 and 114 are each connected in parallel with one or more LEDs to provide fault tolerance. Some sapphire-based LED have zener diodes included in the package for electrostatic discharge protection purposes. In a first embodiment, each parallel element 112 and 114, respectively is connected in parallel with a single LED 116 and 118, respectively, as illustrated in FIG. 1. In a second embodiment, some or all of the parallel elements 112 and 114 are connected in parallel with more than one LED. For example, each parallel element could be connected in parallel with five LEDs, such that if any of the five LEDs fail by an open circuit, the parallel element will route the current around all five LEDs. This allows for fewer parallel elements, however, such parallel element would need to have a higher voltage drop, approximately five times larger than the parallel elements in the first embodiment. In other examples of the second embodiment, the parallel element may be in parallel with two, three, four or more LEDs. The parallel element may be a zener diode or other circuit. A parallel element and a LED may be packaged together as a single unit. For example, some sapphire-based LEDs have zener diodes included in the package for electrostatic discharge protection purposes. The LED array 110 could include a plurality of such packages connected in series.

The LED system 100 may operate with various supply voltages, for example 1 volt to 45 volts. The LED system 100 may operate at automotive power levels, for example, approximately 12-14 volts. The LED system 100 may be a band limited low electromagnetic interference circuit.

When an LED 116 or 118 fails, the parallel element 112 or 114 connected in parallel with the LED will be activated and route the current flows around the failed LED, thus allowing the remaining LED to operate properly. The failure may be caused by an LED failure, a solder joint failure or other type failure. The parallel elements 112 and 114 may be in an inoperative state until an LED fails. Thus, the parallel elements 112 and 114 would consume little or no power until an LED failed. Once an LED fails, the parallel element 112 or 114 would be activated.

The parallel elements 112 and 114 may comprise a circuit such as a zener diode or other device. The parallel elements 112 and 114 may be connected is series with each other or may simply be connected in parallel with one or more LEDs. The parallel elements 112 and 114 may be any circuit or circuits that pass little or no current at the LEDs' 116 and 118 normal operating voltage range and pass current at voltages larger than the LEDs' 116 and 118 normal operating voltage range. For example, parallel elements 112 and 114 may be a zener diode with a turn-on voltage larger than the LEDs' 116 and 118 normal operating voltage range. Alternatively, the parallel elements 112 and 114 may be a transistor biased with two resistors to turn on the base-emitter junction when the voltage from the collector-to-base exceeds the LEDs' 116 and 118 normal operating voltage range.

The voltage converter 108 may be a high voltage converter or other device that provides an adjustable output DC voltage. The voltage converter 108 adjusts the output voltage such that the current through the LEDs 116 and 118 remains substantially constant in proportion to the commanded current signal. That is, the LED current level will change when the display luminance is changed. The voltage converter 108 generates an output voltage as a function of a supply voltage 104, a current flow signal from the current monitor 120, and/or a commanded LED current signal from the display luminance microprocessor 102 as modified by an optional temperature derating circuit 106.

The microprocessor 102 determines the appropriate LED current that corresponds to the user's commanded luminance. The microprocessor 102 modifies the LED current as a function of the LED temperature to account for the LED efficacy changes as the LED temperature changes. The temperature derating circuit 106 may optionally derate the LED current if the LED temperature becomes too hot. In a system 100 with both a temperature compensation circuit, e.g. the microprocessor 102, and a temperature derating circuit 106, the temperature derating circuit 106 may override the commanded current signal from the microprocessor 102 when the LED temperature becomes too hot.

The voltage converter 108 may include a pulse width modulation converter controller IC, a digital signal processor (DSP), or other type of circuit. The voltage converter 108 provides a current to the LEDs to drive the LEDs at a commanded current generated by the microprocessor 102. The voltage converter 108 may use a current flow signal, also called a current feedback signal, from the current monitor 120 to maintain the commanded current level. When the LED array 110 has an open circuit due to an LED failure or an LED solder joint failure, the voltage converter 108 detects that no current is passing through the circuit and will increase the voltage, possibly creating an over-voltage condition. Thus, the parallel elements 112 and 114 help to prevent such an over-voltage condition in the voltage converter 108 by providing a bypass path.

The current monitor 120, also called a current sampling circuit or an LED current sample resistor, provides a current flow signal to the voltage converter 108. The voltage converter 108 uses this signal to determine the optimal voltage to supply the LEDs to maintain the desired LED current. Since the optimal LED voltage varies as function of temperature and from device to device, the luminance needs to be sampled to determine the LED's current, which is proportional to the LED luminance. Generally, as an LED heats up the LED generates less luminance for a fix current flow through the LED. An LED tends to generate more luminance when more current flows through the LED. The current monitor 120 may be a resistor connected between the series LEDs and ground. The signal from the current sampling circuit may be the voltage drop across the resistor.

When an LED 116 fails that causes an open circuit in the LED series circuit, either by an LED burn-out or an open circuit, or a solder joint failure, the current flow signal from the current monitor 120 indicates that an open circuit has occurred. The voltage converter 108 then increases its output voltage in an attempt to maintain the desired current through the LEDs 116 and 118. As the voltage converter's output voltage is raised, the parallel element 112 that is connected in parallel with the failure will turn on and providing a current bypass of the failure. By bypassing the failure, the remaining LED 118 continues to operate correctly. While an LED failure by a short is an unlikely failure, such a failure will not prevent the other LED from remaining on at the desired luminance. The current monitor 120 will compensate for the reduced load when an LED shorts out. Thus, the brightness of the other LED is unaffected by the shorted or opened LED.

Because LED's luminance or efficacy changes as a function of temperature, a temperature compensation system is desirable to maintain the desired luminance across a range of temperatures. Since the relationship between an LED's luminance and temperature is not necessarily linear, a display luminance microprocessor 102, also called a temperature compensation circuit, may be used to more accurately control the LED's luminance. Maintaining consistent LED luminance is especially important for night time applications, such as in automobiles, laptop computers, personal digital assistances, and cellular telephones. Also, as an LED's temperature increases, the LED's life expectancy may decrease.

The optional temperature derating system may include a temperature sensor 122, an amplifier 124, and/or a temperature derating circuit 106. Alternatively, the derating function may be accomplished by the microprocessor 102. When the LED temperature exceeds a temperature threshold, the temperature derating circuit 106 reduces the current flowing through the LEDs to prevent LED burnout.

The temperature sensor 122, also called an LED temperature sensing device or a temperature resistor or a temperature monitoring circuit, may be a temperature sensitive device thermally and/or electrically connected with a cathode terminal of an LED. The temperature sensor 122 may measure the solder temperature near the cathode terminal. The LED's temperature may be inferred from the solder temperature. This temperature may be used to compensate and/or derate the LED array. The solder temperature may be converted into an ambient temperature, which can be used to derate the LED from the LED's specification sheets. The temperature signal may be sent to the amplifier 124 then to the display luminance microprocessor 102 and the temperature derating circuit 106. The display luminance microprocessor 102 sends a "commanded current" signal to the temperature derating circuit 106 based on the amplified temperature signal.

Figure 2:
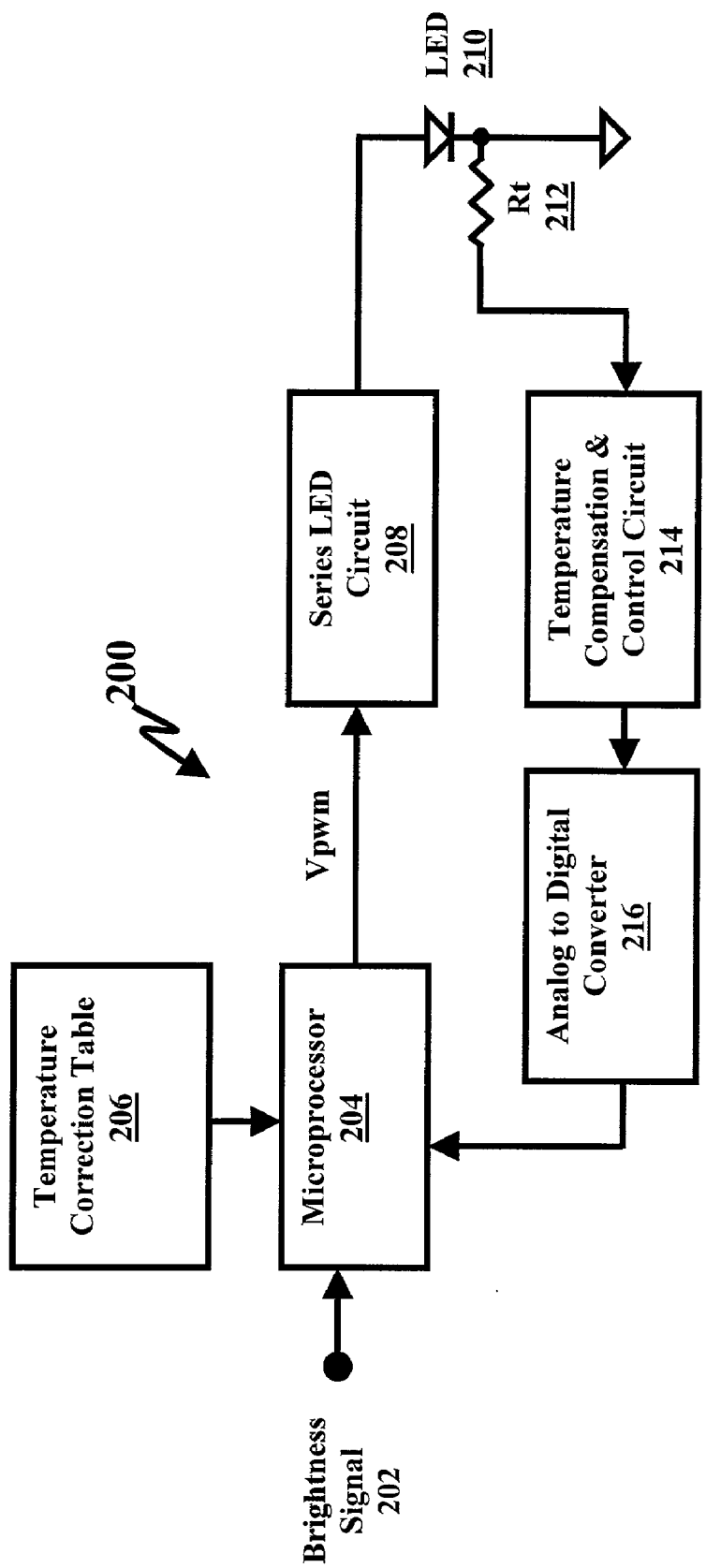
FIG. 2 illustrates a block diagram of a series LED control circuit.

FIG. 2 illustrates a block diagram of a series LED control circuit 200. The LED control circuit 200 adjusts the current provided to the LEDs 210 based on an LED temperature. As an LED heats up, the brightness decreases at the same current. Thus, to maintain consistent brightness as an LED heats up, the LED's current must be increased. Since the relationship between the temperature and the LED's brightness is not linear, a software solution may be desirable.

A command brightness signal 202 that indicates the desired brightness of the LED 210 is received by the microprocessor 204. A microprocessor 204 then uses a digital temperature signal from the A/D converter 216 to determine the appropriate temperature correction factor from the temperature correction factor table 206. The microprocessor 204 sends an adjusted brightness signal to the series LED drive circuit 208. The adjusted brightness signal may be a PWM signal. The temperature of the LED 210 is measured by a thermal resistor 212, labeled "Rt." The temperature compensation and control circuit 214 receives the temperature measurement from the thermally sensitive resistor 212. The temperature signal is then converted in a digital signal by an A/D converter 216 and sent to the microprocessor 204.

Figure 3:
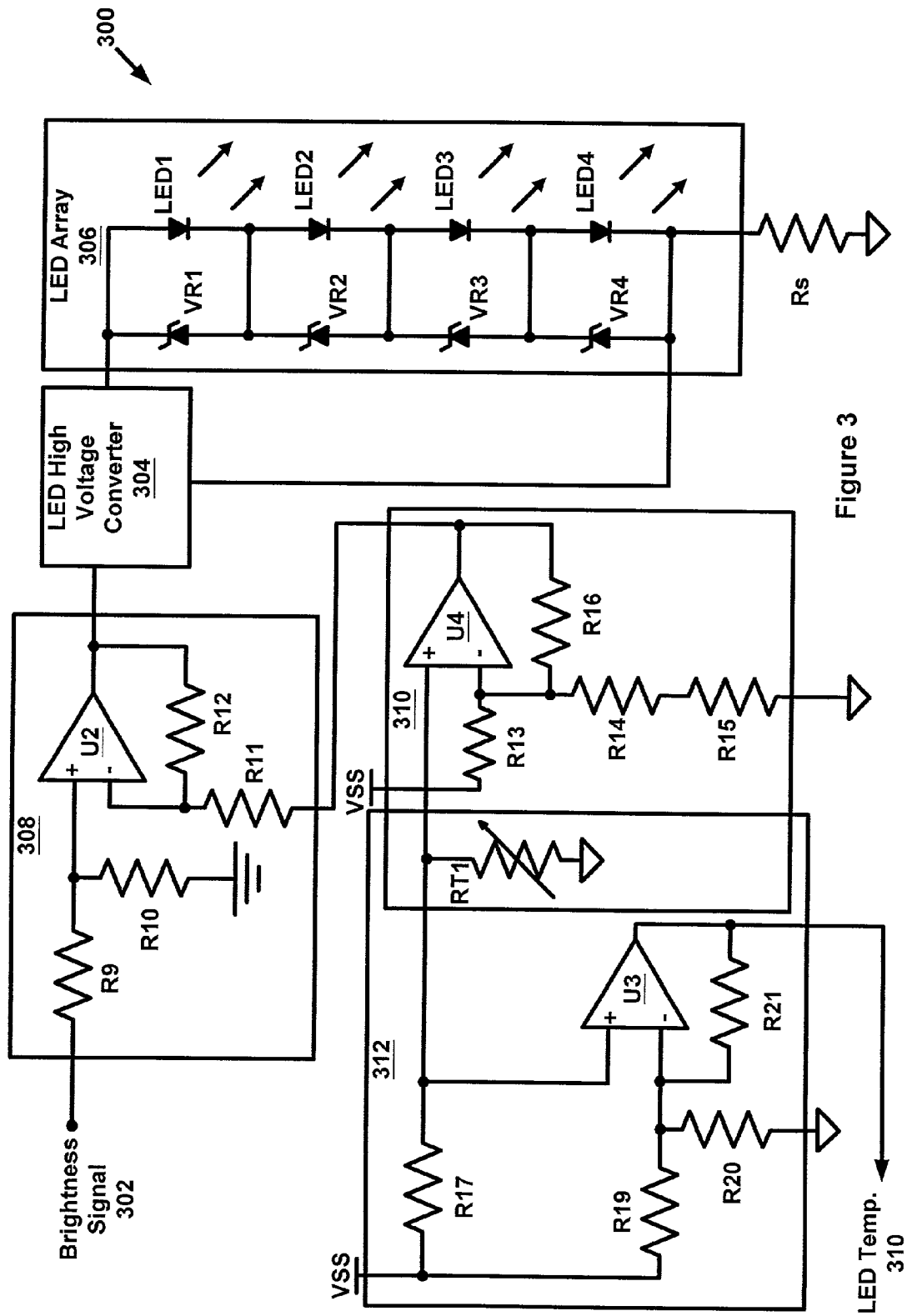
FIG. 3 illustrates a circuit diagram of a series LED control circuit.

FIG. 3 illustrates a circuit diagram of an embodiment of a series LED system. The LED system 300 may include an LED array 306, a voltage converter 304, a brightness control circuit 308, a temperature derating circuit 310, and a temperature monitoring circuit 312.

The brightness control circuit 308 receives a brightness signal at node 302 and controls the brightness of the LED array 306. The brightness signal may be a desired brightness level for the LED array 306, for example daytime brightness or night time brightness in an automotive radio display. The operational amplifier U2 is configured as a differential amplifier where the ratios of the operational amplifier's resistors are substantially balanced. That is, R12/R11=R10/R9. When the ratios of the operational amplifier's resistor R12/R11 and R10/R9 are both substantially equal to one, the differential gain of the operational amplifier U2 is substantially unity.

The input node 302 of the LED circuit 300 may receive an input signal from a microprocessor or other controller. The input signal may be a pulse width modulated ("PWM") signal, a DC voltage signal, or other type of signal. A PWM input signal controls the intensity of the LED based on the duty cycle and/or the voltage level of the input signal. Generally, as the duty cycle of the input signal increases, the LEDs become brighter. A DC voltage input signal controls the intensity of the LED based the voltage level of the input signal. Generally, as the voltage level at the input node 302 increases, the LEDs become brighter.

The temperature derating circuit 310 derates the current supplied to the LED array 306 when the LED temperature increases beyond a threshold. Derating the LED array 306 current prolongs the life expectancy of the LEDs. The output of the operational amplifier U4 is at substantially ground when no temperature derating is required and the operational amplifier U2 passes the brightness signal from input node 302 with the gain set by the ratios of the resistors R9-R12, which may be a unity gain. The brightness signal may be a steady DC voltage, a pulse width modulated signal, or an other type of signal.

The derating operational amplifier U4 normally operates in a rail-to-rail mode. When the LED array 306 is operating in a normal operating temperature range, the output of the derating operational amplifier U4, known as the temperature derating level, is substantially ground. As the temperature of the LED array 306 increases, the temperature derating level increases after a predetermined LED threshold temperature is reached. Since the thermal resistor RT1 is thermally connected with the same thermal plane as the LED array 306 is heat sunk to, the resistance of the thermal resistor RT1 varies as a function of the temperature of the solder near the cathode terminals of the LEDs. The thermal resistor RT1, also called a temperature sensor, has a resistance that varies as a function of a measured temperature. For example, the thermal resistor RT1 may be a model KT230 available from Infineon Technologies A.G. The model KT230 is a temperature dependent resistor with a resistance tolerances of +/−3% at 1,000 Ohms, a temperature range of −50 degree Centigrade to +150 degree Centigrade, and is available in SMD or leaded or customized packages. The model KT230 has a linear output, a positive temperature coefficient, a long term stability, a fast response time, and is polarity independent due to symmetrical construction. Other commonly available temperature sensors, such as models LM135 and LM50 from the National Semiconductor, Inc., may also be used.

When the operational amplifier U2 receives an output voltage greater than zero volts from the derating operational amplifier U4 through resistor R11, the output voltage acts as a negative offset to the input voltage at the input node 302. The LEDs then become less bright as the temperature increases. For example, if the brightness signal at the input node 302 is 5 VDC and the temperature derating level is 1.5 V, the output of the operation amplifier U2 is substantially 3.5 V. The temperature derating circuit 310 may shut off the LED array 306 if the measured temperature reaches a predetermined temperature threshold.

The temperature monitoring circuit 312 provides a temperature output signal at output node 310 that indicates a temperature associated with the LED array 306. The LED temperature output signal may be a function of the LED temperature as measured by the thermal resistor RT1. The thermal resistor RT1 may be used for the temperature monitoring circuit 312 and the temperature derating circuit 310. The temperature monitor amplifier U3 monitors a voltage difference between a first voltage divider circuit R19 and R20 and a second voltage divider circuit R17 and RT1. The output of the temperature monitor amplifier U3 is connected with the output node 310.

D. EXAMPLE EMBODIMENT OF THE LED CIRCUIT

The LED system 300 of FIG. 3 may include components as indicated in Table 1. Other types of components and components of different values may also be used in the LED system 300 as will be apparent to one of skill in the art.

TABLE 1

| Ref. | Description |
|---|---|
| LED1-4 | Light emitting diodes (LEDs). For example, a white LED from Infineon model LW E673 or LW E67C, red LED model LSA677-Q, green LED model LTA673-R24, or a blue LED LBA673-N24 all from Infineon Technology AG. |
| U2-4 | Operational amplifiers, for example a model LMV321 available from National Semiconductor Corp. or a model TLC 2274 Rail-to-Rail Operational Amplifier available from Texas Instruments, Inc. |
| VR1-4 | Zener diodes, for example a 5.1 V zener diode. |
| R9-21 | Resistors, for example a 20 K Ohms resistor. Other resistance values may also be used, for example, 200 to 200 K Ohms. |
| RT1 | A resistor with a temperature dependant resistance, for example KT230 available from Infineon Technology A.G. |
| Rs | A resistor, for example a 165 Ohm resistor. |

E. Method Of Controlling LEDs

Figure 4:
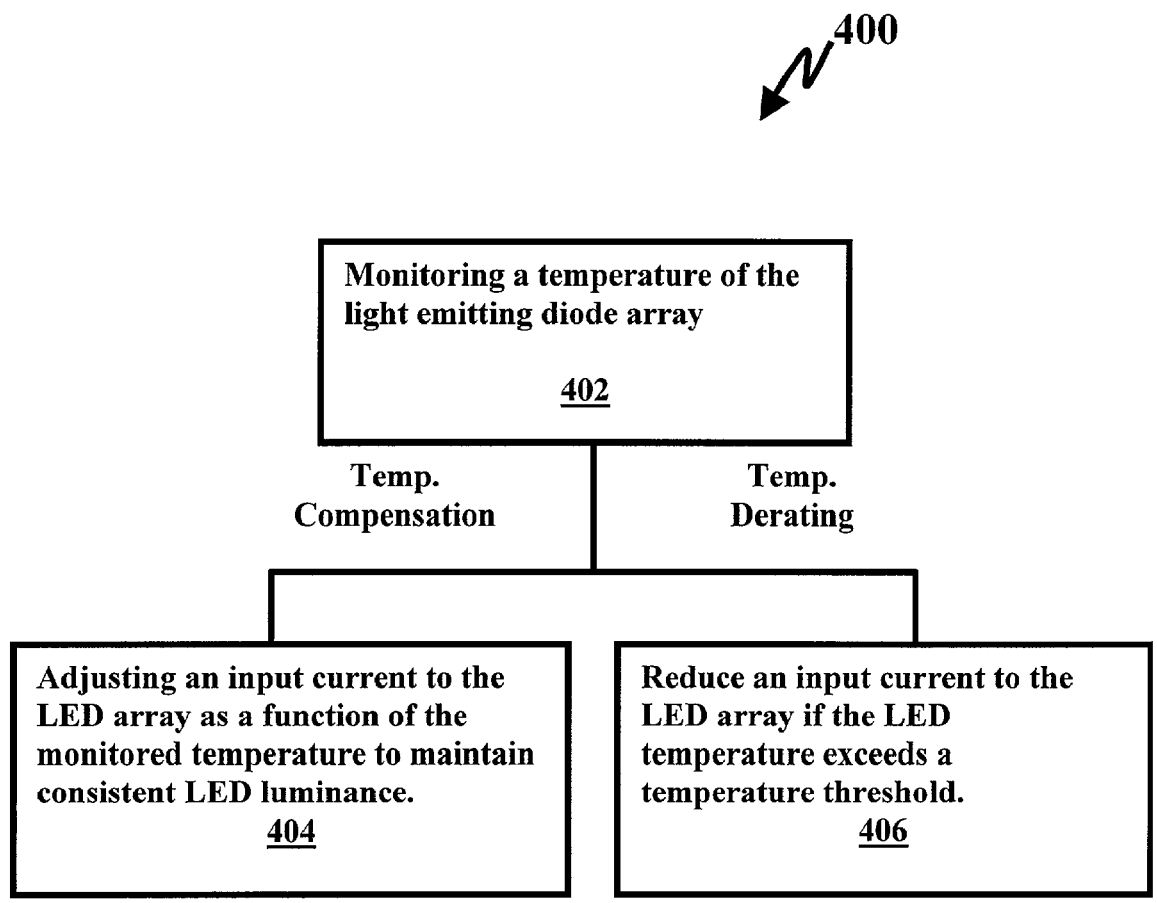
FIG. 4, illustrate a flow diagram of a method of controlling a series light emitting diode array.

Referring to FIG. 4, a method 400 of controlling a series light emitting diode array is illustrated. In block 402, the temperature of the light emitting diode array is monitored. In block 404, the LEDs are temperature compensated. The current to the light emitting diode array is adjusted as a function of the monitored temperature to maintain consistent LED luminance. Because as an LED's temperature increases the LED's luminance decreases, as the LED's temperature increase, the current through the LED needs to be increased to maintain consistent luminance.

In block 406, the LEDs are temperature derated. If the LED temperature exceeds a temperature threshold, for example, 55 degrees Celsius, the input current to the LED array is reduced. The temperature threshold may vary depending on the type of LED, the application, and other considerations. Temperature derating reduces the likelihood of LED burn out and may be used only when the LED is near the brink of a burn out. The method 400 may be run constantly or may be run periodically. Portions of the method 400 may be performed with hardware, software, or a combination of hardware and software.

F. Application of the LED Backlighting System

The LED devices and systems describe above may be used in a variety of systems including an LCD backlighting display unit adapted for an automotive application. Such a backlighting display unit may include a liquid crystal display, a plurality of light emitting diodes connected in a series configuration, and a plurality of parallel elements connected in parallel with the light emitting diodes such that current is routed around a light emitting diode with a failure when the failure comprises an open circuit.

As a person skilled in the art will recognize from the previous description and from the figures and claims, modifications and changes can be made to the preferred embodiments of the invention without departing from the scope of the invention defined in the following claims.

What is claimed is:

1. A system for a backlit display, comprising:
a plurality of light emitting diodes connected together in series;
a plurality of parallel elements connected in parallel with the plurality of light emitting diodes, and wherein the plurality of light emitting diodes are adapted to provide back lighting for a liquid crystal display;
a current monitor connected with the plurality of light emitting diodes that measures an amount of current flowing from the plurality of light emitting diodes and generates a current flow signal;
a temperature sensor in communication with the plurality of light emitting diodes to measure a temperature of the light emitting diodes and generate a temperature signal corresponding to the temperature;
a voltage converter that supplies a current to the plurality of light emitting diodes as a function of the current flow signal, a commanded current signal, and the temperature signal, when in a first mode below a threshold temperature the voltage converter being in electrical communication with the plurality of parallel elements to automatically increase a voltage across a parallel element of the plurality of parallel elements based on the current flow signal, thereby causing the current to flow through the parallel element and around a light emitting diode of the plurality of light emitting diodes upon an open circuit failure of the light emitting diode and maintain a consistent brightness, and when in a second mode above a threshold temperature the voltage converter being configured to reduce the current to the plurality of light emitting diodes as a function of the temperature signal.

2. The device of claim 1, further comprising a temperature derating circuit that reduces the current to the plurality of light emitting diodes the temperature signal exceeds the temperature threshold.

3. The device of claim 2, wherein a first feedback loop is formed by providing the temperature signal to the temperature derating circuit.

4. The device of claim 2, further comprising a luminance display processor configured to adjust the commanded current signal based on the temperature signal to provide the consistent brightness from the plurality of light emitting diodes.

5. The device of claim 4, wherein the luminance display processor adjusts the commanded current signal to as a function of a measured temperature and a temperature correction factor table.

6. The device of claim 4, wherein a first feedback loop is formed by providing the temperature signal to the temperature derating circuit.

7. The device of claim 6, wherein the second feedback loop is formed by adjusting the commanded current signal in the luminance display processor based on the temperature signal.

8. The device of claim 7, wherein the commanded current signal is provided to the temperature derating circuit from luminance display processor.

9. The system of claim 1, wherein the commanded current signal comprises a direct current signal.

10. The device of claim 1, wherein the commanded current signal comprises a pulse width modulated signal.

11. The device of claim 1, wherein the plurality of parallel elements comprises a plurality of zener diodes.

12. The device of claim 1, wherein a parallel element is connected in parallel with a light emitting diode of the plurality of light emitting diodes.

13. The device of claim 1, wherein a parallel element is connected in parallel with multiple light emitting diodes of the plurality of light emitting diodes.

14. The device of claim 1, wherein the temperature sensor measures a solder temperature near a light emitting diode.

15. The device of claim 1, wherein the temperature sensor comprises a temperature dependant resistor.

16. The device of claim 15, wherein a terminal of the temperature dependant resistor and a cathode terminal of a light emitting diode of the plurality of light emitting diodes are thermally interconnected.

\* \* \* \* \*